(12) United States Patent
Hellwig et al.

(10) Patent No.: US 8,541,116 B2
(45) Date of Patent: Sep. 24, 2013

(54) PATTERNED PERPENDICULAR MAGNETIC RECORDING DISK DRIVE AND MEDIUM WITH PATTERNED EXCHANGE BRIDGE LAYER BELOW THE DATA ISLANDS

(75) Inventors: Olav Hellwig, San Jose, CA (US); Dan Saylor Kercher, Santa Cruz, CA (US); Ernesto E. Marinero, Saratoga, CA (US); Manfred Ernst Schabes, Saratoga, CA (US); Dieter K. Weller, San Jose, CA (US); Gabriel Zeltzer, Mountain View, CA (US)

(73) Assignee: HGST Netherlands B.V., Amsterdam (NL)

( * ) Notice: Subject to any disclaimer, the term of this patent is extended or adjusted under 35 U.S.C. 154(b) by 451 days.

(21) Appl. No.: 12/906,909

(22) Filed: Oct. 18, 2010

(65) Prior Publication Data
US 2012/0092790 A1  Apr. 19, 2012

(51) Int. Cl.
*G11B 5/66* (2006.01)
(52) U.S. Cl.
USPC ........................... 428/828.1; 428/827
(58) Field of Classification Search
USPC ............ 428/800, 828, 828.1, 848.5, 836.2, 428/831.2, 846, 815, 827, 829; 360/125.2, 360/135, 59, 29
See application file for complete search history.

(56) References Cited

U.S. PATENT DOCUMENTS

| | | | |
|---|---|---|---|
| 7,097,924 B2 | 8/2006 | Haginoya et al. | |
| 7,422,808 B2 | 9/2008 | Sugimoto et al. | |
| 2004/0166372 A1* | 8/2004 | Haginoya et al. | 428/815 |
| 2008/0096053 A1* | 4/2008 | Bian et al. | 428/829 |
| 2008/0292907 A1* | 11/2008 | Berger et al. | 428/828 |
| 2009/0004509 A1 | 1/2009 | Benakli et al. | |
| 2009/0169731 A1 | 7/2009 | Albrecht et al. | |
| 2009/0257147 A1* | 10/2009 | Ajan | 360/125.02 |

FOREIGN PATENT DOCUMENTS

JP  2008159196 A  7/2008

* cited by examiner

*Primary Examiner* — Kevin M. Bernatz
*Assistant Examiner* — Louis Falasco
(74) *Attorney, Agent, or Firm* — Thomas R. Berthold

(57) ABSTRACT

A patterned perpendicular magnetic recording disk with discrete data islands of recording layer (RL) material includes a substrate, a patterned exchange bridge layer of magnetic material between the substrate and the islands, and an optional exchange-coupling control layer (CCL) between the exchange bridge layer and the islands. The exchange bridge layer has patterned pedestals below the islands. The exchange bridge layer controls exchange interactions between the RLs in adjacent islands to compensate the dipolar fields between islands, and the pedestals concentrate the flux from the write head. The disk may include a soft underlayer (SUL) of soft magnetically permeable material on the substrate and a non-magnetic exchange break layer (EBL) on the SUL between the SUL and the exchange bridge layer. In a thermally-assisted recording (TAR) disk a heat sink layer may be located below the exchange bridge layer and the SUL may be optional.

21 Claims, 3 Drawing Sheets

PATTERNED PERPENDICULAR MAGNETIC RECORDING DISK DRIVE AND MEDIUM WITH PATTERNED EXCHANGE BRIDGE LAYER BELOW THE DATA ISLANDS

BACKGROUND OF THE INVENTION

1. Field of the Invention

This invention relates generally to patterned perpendicular magnetic recording media, such as disks for use in magnetic recording hard disk drives, and more particularly to patterned perpendicular disks with ultra-high data densities.

2. Description of the Related Art

Magnetic recording hard disk drives with patterned magnetic recording media have been proposed to increase data density. In conventional continuous magnetic recording media, the magnetic recording layer is a continuous layer over the entire surface of the disk. In patterned media, also called bit-patterned-media (BPM), the magnetic recording layer on the disk is patterned into small isolated data islands arranged in concentric data tracks. Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer. Perpendicular media will likely be the choice for patterned media because of the potential for increased data density. To produce magnetic isolation of the patterned data islands, the magnetization of the spaces between the islands is destroyed or substantially reduced to render these spaces essentially nonmagnetic. Alternatively, the media may be fabricated so that that there is no magnetic material in the spaces between the islands.

One problem associated with patterned perpendicular media is a wide distribution of the switching field, i.e., the write field required to switch the magnetization of an island from one magnetic state to the other state. Ideally the switching field distribution (SFD) width would be zero, meaning that all the islands would switch at the same write field strength. A high-width SFD increases the likelihood of the write field switching the magnetization of islands adjacent to the island being addressed, i.e., "overwriting" of previously written data. One significant contribution to a high-width SFD is the magnetostatic coupling of neighboring magnetic islands due to the interactions of dipolar fields from adjacent islands.

Patterned perpendicular disks have been proposed with ultra-high areal bit densities (at least 1 Terabits/in$^2$). However, the adverse effect of magnetostatic coupling becomes more pronounced as the spacing between the islands decreases, which occurs as the areal bit density of the patterned media increases. Ultra-high areal density may also cause an additional problem. Due to the high write field and limited head field gradients achievable there may be fringing fields from the write head leaking into adjacent islands, which can cause overwriting. This problem is exacerbated because the fringing fields acting on adjacent islands encompass relatively large angles with the perpendicular easy-axis of the recording layer on the islands, which increases the likelihood of overwriting.

Patterned perpendicular disks have been proposed primarily for use in conventional magnetic recording, wherein an inductive write head alone writes data to the islands. However, patterned perpendicular disks have also been proposed for use in heat-assisted recording, also called thermally-assisted recording (TAR). In a TAR system, an optical waveguide with a near-field transducer (NFT) directs heat from a radiation source, such as a laser, to heat localized regions of the magnetic recording layer on the disk. The radiation heats the magnetic material locally to near or above its Curie temperature to lower the coercivity enough for writing to occur by the inductive write head.

What is needed is an ultra-high areal density patterned perpendicular disk, usable in both conventional recording systems and TAR systems, with data islands less susceptible to the adverse effects of magnetostatic coupling and fringing fields.

SUMMARY OF THE INVENTION

The invention relates to a patterned perpendicular magnetic recording medium, such as a patterned perpendicular magnetic recording disk for use in hard disk drives, that has discrete data islands with perpendicular magnetic recording layer (RL) material, and to a disk drive with the disk. The disk includes a substrate, a soft underlayer (SUL) of soft magnetically permeable material on the substrate, a nonmagnetic exchange break layer (EBL) on the SUL that breaks the magnetic exchange between the SUL and the islands, a patterned exchange bridge layer of magnetic material between the EBL and the islands, and an optional exchange-coupling control layer (CCL) between the exchange bridge layer and the islands. In the disk for use in a TAR disk drive, a heat sink layer may be located below the patterned exchange bridge layer, and the SUL may be an optional layer located below the heat sink layer.

The exchange bridge layer is patterned, typically by an etching process, such that it has a base layer and patterned pedestals extending from the base layer, with the pedestals being located below and supporting the islands. The exchange bridge layer is formed of soft magnetic material with high magnetic permeability and controls exchange interactions between the RLs in adjacent islands to compensate the dipolar fields between islands. The pedestals also concentrate the flux from the write head, thereby reducing the adverse effect of fringing fields. When the medium is used in a TAR system, the pedestals also focus the radiation from the electric charge oscillations from the NFT onto the islands, thereby increasing the localization of thermal input to the RLs of the islands.

The optional CCL is formed of nonmagnetic or weakly ferromagnetic material and allows some level of exchange coupling between the RL of an island and the exchange bridge layer, and thus further controls the exchange interactions between the RLs in adjacent islands.

For a fuller understanding of the nature and advantages of the present invention, reference should be made to the following detailed description taken together with the accompanying figures.

DETAILED DESCRIPTION OF THE INVENTION

Figure 1A:
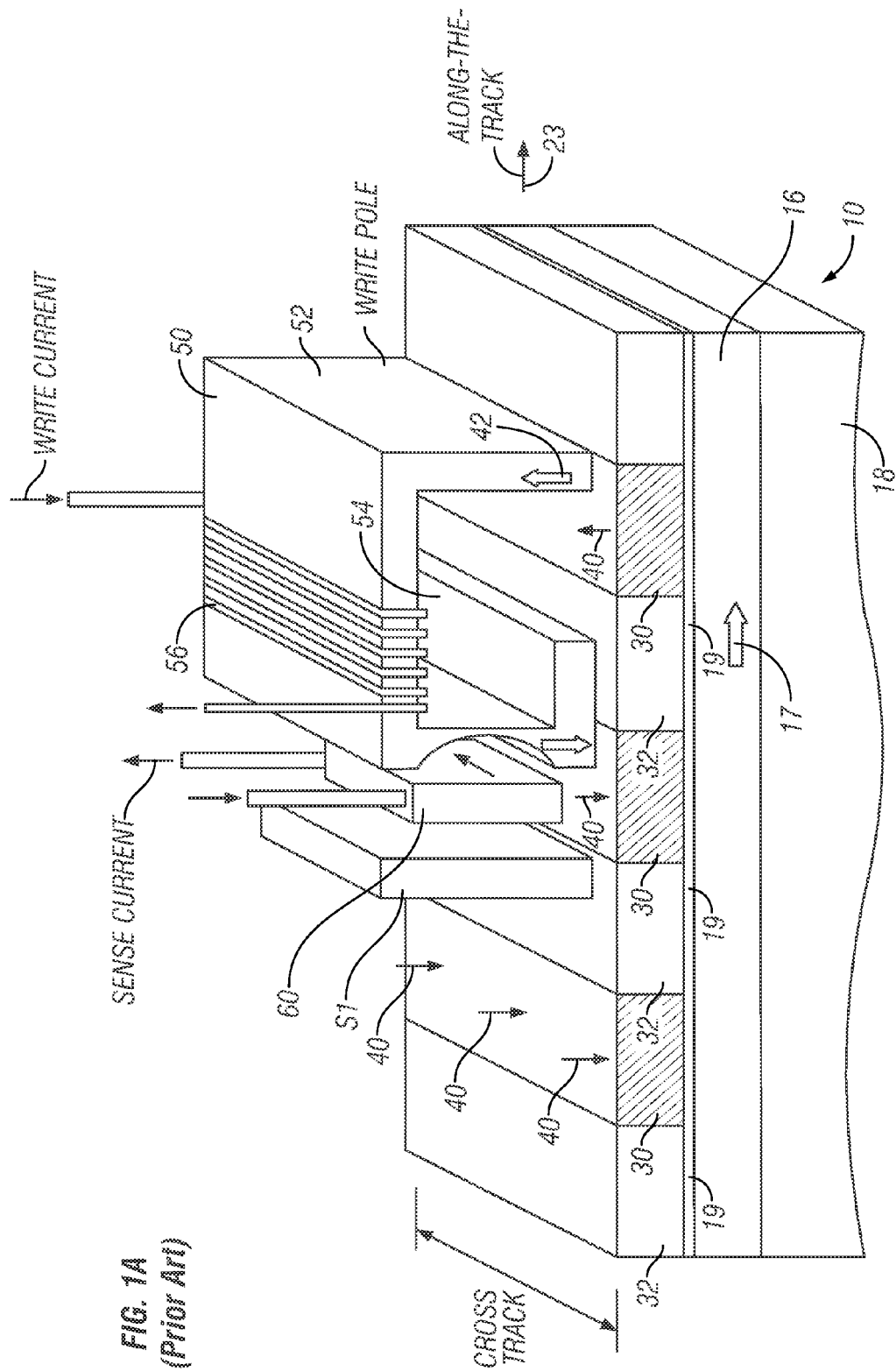
FIG. 1A is a schematic representation of a perpendicular magnetic recording system with a prior art patterned perpendicular medium.

FIG. 1A is a highly schematic representation of a prior art perpendicular magnetic recording system with patterned perpendicular media. The system can be implemented in a magnetic recording disk drive, with the medium being a magnetic recording disk with the patterned bits arranged into concentric circular data tracks. FIG. 1A thus shows a portion of a disk 10 that includes a substrate 18 with a "soft" or relatively low-coercivity magnetically permeable underlayer (SUL) 16 having a relatively planar surface. Layer 19 is a nonmagnetic exchange break layer (EBL) located between the magnetically permeable SUL 16 and the recording layer material in the patterned bits 30 to break the magnetic exchange coupling between the recording layer and the SUL 16. A plurality of discrete patterned magnetic recording bits or islands 30 extend generally perpendicularly from the EBL 19. The islands 30 are spaced apart by nonmagnetic regions 32, which may formed of polymeric material for planarizing disk 10. The islands 30 are magnetized perpendicularly, as depicted by arrows 40, resulting in the recorded bits being stored in the recording layer of the islands 30 in a generally perpendicular or out-of-plane orientation. The islands 30 are discrete magnetic islands that function as the patterned bits.

Also shown in FIG. 1A is the read head 60 and the write head 50 (with write pole 52 and a return pole 54). Write current passes through a coil 56 of the write head 50 to generate a magnetic field (arrow 42) at the write pole 52. This magnetic field magnetizes the recording layer on the island 30 beneath the write pole in the direction 40 as the disk 10 moves past the write head 50 in the direction of arrow 23. The SUL 16 serves as a flux return path (arrow 17) for the magnetic field between the write pole 52 and the return pole 54 of the write head 50. The detection or reading of the recorded bits is by a read head 60, typically a magnetoresistive (MR) read head, such as a tunneling MR (TMR) read head in which a sense current passes perpendicularly through the layers making up the head. A pair of magnetic permeable shields, one of which is shown as shield S1, is located on opposite sides of read head 60 to prevent magnetic flux from bits other than the bit being read from reaching the read head 60. In a magnetic recording disk drive the write head 50, read head 60 and shields are formed on the trailing surface of an air-bearing slider that has its air-bearing surface (ABS) facing the disk.

FIG. 1A thus depicts a conventional magnetic recording system with patterned perpendicular media. However, heat-assisted recording, also called thermally-assisted recording (TAR), has been proposed. In a TAR system, an optical waveguide with a near-field transducer (NFT) directs heat from a radiation source, such as a laser, to heat localized regions of the magnetic recording layer on the disk. The radiation heats the magnetic material locally to near or above its Curie temperature to lower the coercivity enough for writing to occur by the write head.

Figure 1B:
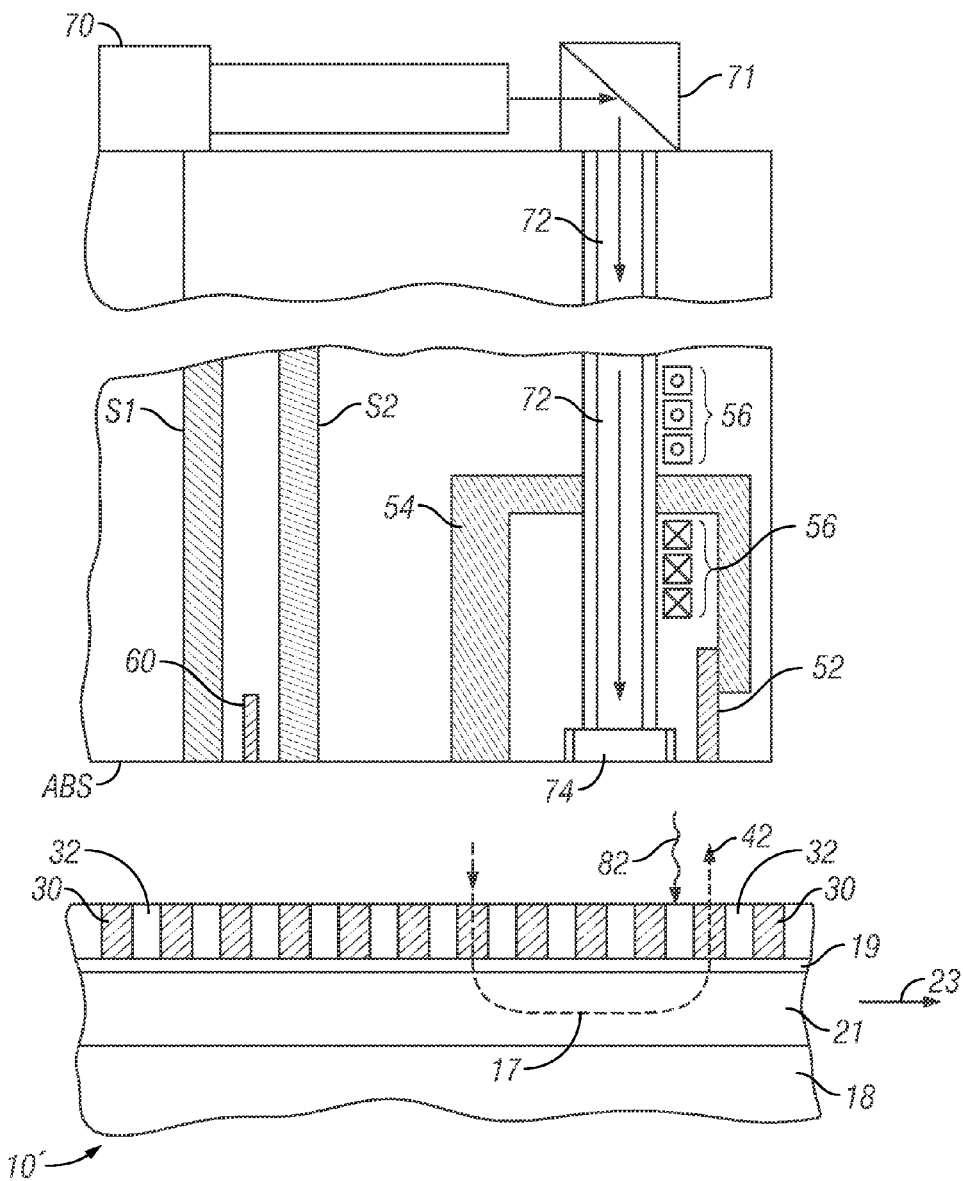
FIG. 1B is a sectional view through a portion of a disk and an air-bearing slider that supports an optical channel and near-field transducer (NFT) for use in a thermal assisted recording (TAR) system.

An air-bearing slider for use in a TAR system is shown in FIG. 1B, which is not drawn to scale because of the difficulty in showing the very small features. FIG. 1B is a sectional view through a portion of a TAR disk 10' and the air-bearing slider that supports the write head 50, read head 60, and shields S1 and S2. In the TAR disk 10', a heat sink layer 21 is located below the islands 30 and nonmagnetic regions 32. Heat sink layer 21 is formed of a material that is a good thermal conductor, like Cu, Au, Ag or other suitable metals or metal alloys. Layer 19 may be a thermal resist layer, such as a layer of MgO or SiO2, between the heat sink layer 21 and the islands 30 to help control the heat flow so that heat is not distributed too rapidly into the heat sink layer 21. The TAR disk 10' may also include one or more seed layers (not shown) directly below the islands 30 to facilitate the growth of the magnetic material in the islands. The TAR disk 10' may also include an optional SUL, which if present would be located below the heat sink layer 21. The slider has an air-bearing surface (ABS) that faces the disk 10'. The slider also supports a laser 70, mirror 71, optical channel 72 and NFT 74, which has its output at the ABS. The optical waveguide or channel 72 is depicted in FIG. 1B as extending through the yoke of write head 50 and being located between the write pole 52 and return pole 54; however the optical waveguide 72 may be located at other locations on the slider, such as between shield S2 and return pole 54, or between the write pole 52 and the outer face of the slider.

When write-current is directed through coil 56, the write pole 52 directs magnetic flux to the data islands 30, as represented by arrow 80 directed to one of the data islands 30. The dashed line 17 with arrows shows the flux return path back to the return pole 54. The NFT 74 directs near-field radiation, as represented by wavy arrow 82, to the data islands 31 as the TAR disk 10' moves in the direction 23 relative to the slider. The electric charge oscillations in the NFT heat the data islands 30 at the same time the data islands are exposed to the write field from the write pole 52. This raises the temperature of the magnetic recording material in the data islands to near or above its Curie temperature to thereby lower the coercivity of the material and enable the magnetization of the data island to be switched by the write field.

Figure 2:
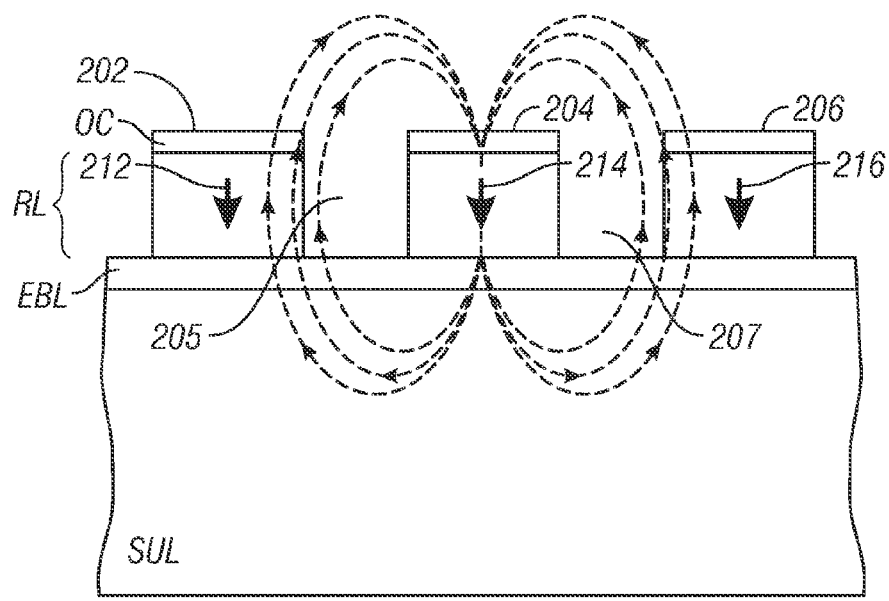
FIG. 2 is a schematic illustrating the adverse effect of magnetostatic coupling between adjacent data islands in a patterned perpendicular medium according to the prior art.

FIG. 2 is a schematic illustrating the adverse effect of magnetostatic coupling between adjacent data islands in patterned perpendicular media. The media structure includes three adjacent discrete magnetic islands 202, 204, 206, and two nonmagnetic spaces or regions 205, 207 separating the magnetic islands. The magnetic islands are located on a nonmagnetic exchange break layer (EBL) 230 that is formed on the SUL. Each magnetic island is shown with a recording layer (RL) and a protective overcoat (OC). The magnetic islands are depicted as being magnetized in the same perpendicular direction, as shown by arrows 212, 214, 216 in the RLs of islands 202, 204, 206, respectively. The field lines from magnetized island 204 are shown to illustrate how each magnetized island may have a magnetostatic coupling effect on adjacent islands. The field from magnetization 214 of island 204 is a "demagnetizing" field because it is opposite to the magnetizations 212 and 216 of islands 202 and 206, respectively. This field may tend to demagnetize islands 202, 204 and also affects the switching field of these islands. Pending application Ser. No. 11/964,685, filed Dec. 26, 2007 and assigned to the same assignee as this application, describes a BPM disk with a continuous non-patterned exchange-bridge layer below the islands for mitigating the effects of magnetostatic coupling.

The adverse effect of magnetostatic coupling becomes more pronounced as the spacing between the islands decreases, which occurs as the areal bit density of the patterned media increases. If the islands have a width and length of about 20 nm and the island-to-island spacing in both the radial or cross-track direction and the along-the-track direction is about 35 nm, then these dimensions would result in areal bit density of about 500 Gbits/in$^2$. To achieve patterned-media disks with an ultra-high areal bit density (at least 1 Terabits/in$^2$), smaller islands with a track pitch of about 36 nm and an island pitch of about 18 nm will be required if a 2:1 aspect ratio of the cross-track pitch to the along-the-track pitch is chosen.

Figure 3:
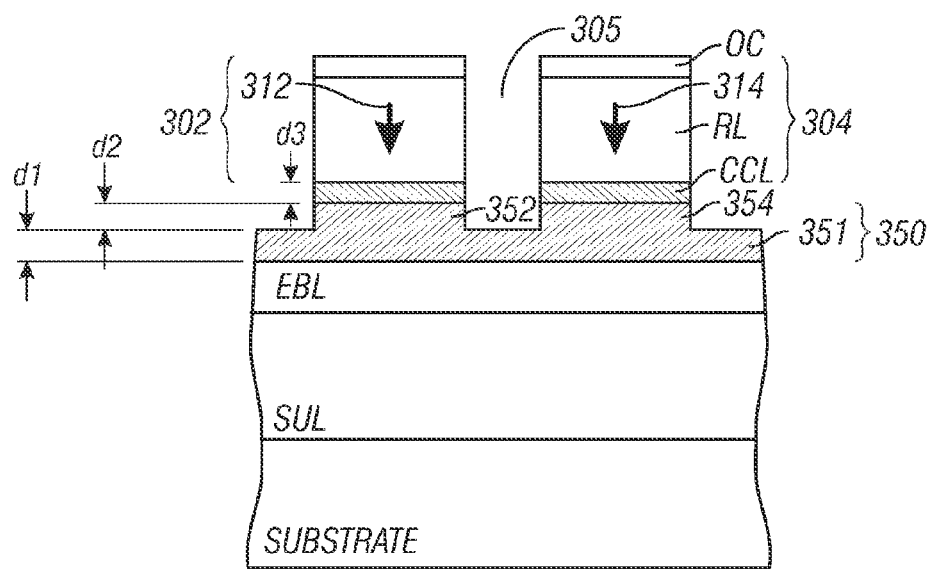
FIG. 3 is a sectional view of the patterned perpendicular medium according to the invention.

FIG. 3 is a sectional view of the patterned perpendicular medium according to the invention. The medium is shown with two adjacent discrete magnetic data islands 302, 304 and a nonmagnetic space or region 305 separating the magnetic islands. Each magnetic island is shown with a recording layer (RL) and a protective overcoat (OC). The magnetic islands are depicted as being magnetized in the same perpendicular direction, as shown by arrows 312, 314 in the RLs of islands 302, 304, respectively.

The RL may be formed of conventional magnetic recording material like a granular polycrystalline cobalt alloy, such as a CoPt or CoPtCr alloy, with or without a suitable well-known segregant, such as oxides, like oxides of Si and Ta. In applications without TAR, a preferred structure of the RL includes this type of granular polycrystalline cobalt alloy, but typically with less segregant than used in a conventional non-patterned magnetic recording medium. The reduced amount of segregant leads to strong intergranular magnetic exchange coupling between the grains within an island. The RL may also be a metallic multilayer with perpendicular magnetic anisotropy, like a Co/Ni, Co/Pt, Co/Pd, Fe/Pt or Fe/Pd multilayer. The RL may also be one of the well-known chemically-ordered binary alloys CoPt, CoPd, FePt, FePd, $CoPt_3$, $Co_3Pt$, $CoPd_3$ and $Co_3Pd$ or pseudo-binary alloys based on the CoPt and FePt $L1_0$ phase. Chemically-ordered alloys of CoPt, CoCrPt, CoPd, FePt and FePd (all ordered in $L1_0$ or $L1_1$) and $CoPt_3$, $Co_3Pt$ and $CoPd_3$ (all ordered in $L1_2$) in their bulk form, are known for their high magneto-crystalline anisotropy and magnetization, properties that are desirable for high-density magnetic recording materials. Pseudo-binary alloys based on the CoPt $L1_1$ and FePt $L1_0$ phase, e.g., $(Co_{(y)}Pt_{(100-y)})$—X and $(Fe_{(y)}Pt_{(100-y)})$—X, where y is between about 45 and 55 atomic percent and the element X may be Ni, Au, Cu, Pd or Ag and is present in the range of between about 0% to about 20% atomic percent, are also suitable high anisotropy materials. While the pseudo-binary alloys in general have similarly high anisotropy as the binary alloys FePt and CoPt, they allow additional control over the magnetic and structural properties of the media. Combinations of metallic multilayers and layers of granular alloys are also possible as the RL.

The RL may also be an exchange-coupled composite, also called "exchange-spring", perpendicular magnetic recording medium like that known for conventional continuous magnetic recording. This type of medium is a composite medium of two ferromagnetically exchange-coupled magnetic layers with different anisotropy fields ($H_k$). In the presence of a uniform write field the magnetization of the lower-$H_k$ layer will rotate first and assist in the reversal of the magnetization of the higher-$H_k$ layer. This behavior is sometimes called the "exchange-spring" behavior. BPM with an exchange-spring RL has been proposed in US 20080292907 A1, assigned to the same assignee as this application.

The OC formed on top of the RL may be an amorphous "diamond-like" carbon (DLC) film or another known protective overcoat, such as a Si-nitride, a boron nitride or a boron carbide.

The medium of FIG. 3 also includes a substrate, a SUL on the substrate, and a nonmagnetic EBL on the SUL. The SUL may be a single layer formed of magnetically permeable materials, such as alloys of CoNiFe, FeCoB, CoCuFe, NiFe, FeAlSi, FeTaN, FeN, FeTaC, CoTaZr, CoFeTaZr, CoFeB, and CoZrNb, or a laminated structure formed of multiple soft magnetic films separated by nonmagnetic films, such as electrically conductive films like Al and CoCr or antiferromagnetic coupling films like Ru and Ir. The SUL acts to carry the flux from the magnetic write field and thus must be relatively thick, typically in the range of 15 to 100 nm. The substrate may be any commercially available glass disk blank, but may also be a conventional aluminum alloy with a NiP surface coating, or an alternative disk blank, such as silicon, canasite or silicon-carbide. An optional adhesion layer (not shown) for the growth of the SUL, such as an AlTi alloy, may be formed on the substrate before deposition of the SUL.

The EBL is located on top of the SUL. It acts to break the magnetic exchange coupling between the magnetically permeable films of the SUL and the RLs in the islands. The EBL can be a nonmagnetic titanium (Ti) or tantalum (Ta) layer; a non-electrically-conducting material such as Si, Ge and SiGe alloys; a metal such as Cr, Ru, W, Zr, Nb, Mo, V and Al; a metal alloy such as amorphous TaCr, CrTi and NiP; an amorphous carbon such as $CN_x$, $CH_x$ and C; or oxides, nitrides or carbides of an element selected from the group consisting of Si, Al, Zr, Ti, and B, or $SiO_2$. The total thickness of the EBL is between about 10-30 nm. An optional seed layer (not shown) may be deposited on the surface of the SUL before deposition of the EBL. For example, if a TaCr alloy is used as the EBL, a 1-5 nm thick layer of SiN or Ta may be used as the seed layer.

In this invention, as shown in FIG. 3, a patterned exchange bridge layer 350 of magnetic material is located between the EBL and the islands 302, 304, and an optional exchange-coupling control layer (CCL) is located between the exchange bridge layer 350 and the islands 302, 304. The EBL, exchange bridge layer 350, CCL and RL are deposited as full films on the SUL. The structure is lithographically patterned and then etched down to a portion of the exchange bridge layer 350, as shown in FIG. 3. This results in the base layer 351 and patterned pedestals 354 extending from the base layer 351, with the pedestals 354 being located below and supporting the discrete islands, like pedestal 352 below island 302 and pedestal 354 below island 304. The patterned structure may be then planarized, such as by depositing a nonmagnetic polymeric planarizing material over the structure in the nonmagnetic spaces, like space 305, following by chemical-mechanical-polishing (CMP) to form the planarized surface. The OC may then be deposited on the planarized surface.

The exchange bridge layer 350 is formed of soft magnetic material, i.e., material with a relatively low coercivity, with high magnetic permeability. Thus the exchange bridge layer 350 may be formed of any of the same materials used for the SUL. The exchange bridge layer 350 may also be formed of a multilayer of alternating films, like a Co/Pd, Co/Pt or Co/Ni multilayer. The low coercivity and high magnetic permeability of the multilayer is achieved by varying the relative thicknesses of the alternating films. For example, a Co/Ni multilayer with 3-6 bilayers, with Co having a thickness of 0.1 to 0.2 nm and Ni having a thickness of 0.4 to 0.7 nm, would provide a suitable material for the exchange bridge layer 350. The exchange bridge layer 350 controls exchange interactions between the RLs in adjacent islands to fully or partially compensate the demagnetizing fields between islands. The pedestals 352, 354 also concentrate the flux from the write head by lowering the reluctance between the write pole and the SUL along a path that contains the RL of the islands. The base layer 351 of exchange bridge layer 350 has a thickness d1, which is preferably between about 0.5 to 3.0 nm. The pedestals have a height d2 above the base layer 351 that is preferably between about 1 to 5 nm. The thicknesses d1 and d2, and in particular their ratio, may be selected to achieve the desired amount of exchange interaction.

When the medium of this invention as shown in FIG. 3 is used as a TAR disk in a TAR system, the SUL is optional. If there is no SUL, then there is no need for an EBL. So the SUL and EBL in FIG. 3 would be replaced by a heat sink layer formed of a good thermal conductor, like Cu, Au, Ag or other suitable metals or metal alloys. If a SUL is used in the TAR disk it would be located below the heat sink layer. In a TAR disk the pedestals 352, 354 also focus the radiation from the electric charge oscillations from the NFT onto the islands, thereby increasing the localization of thermal input to the RL of the islands. When the pedestals serve the additional function of focusing the radiation of the NFT 74, the pedestals 352, 354 direct near-field radiation, as represented by wavy arrow 82, to the data islands 31 as the disk 10 moves in the direction 23 relative to the slider.

An optional exchange-coupling control layer (CCL) of nonmagnetic or weakly ferromagnetic material may located between the pedestals and the RLs in the islands. The CCL is used to allow some level of exchange coupling between the RL of an island and the exchange bridge layer 350 and thus to further control the exchange interactions between the RLs in adjacent islands.

The CCL may be a hexagonal-close-packed (hcp) material, which can mediate a weak ferromagnetic coupling and may also provide a good template for the growth of the RL, depending on the material used for the RL. Because the CCL must enable an appropriate interlayer exchange coupling strength, it should be either nonmagnetic or weakly ferromagnetic. Thus the CCL may be formed of RuCo and RuCoCr alloys with low Co content (<about 65 atomic percent), or CoCr and CoCrB alloys with high Cr and/or B content (Cr+B>about 30 atomic percent). Si-oxide or other oxides like oxides of Ta, Ti, Nb, Cr, V and B may be added to these alloys. The CCL may be formed of nonmagnetic materials like Ru, Rh, Ir and Cu. The CCL may also be formed of face-centered-cubic (fcc) materials, such as Pt or Pd or alloys based on Pt or Pd, because these materials enable a ferromagnetic coupling between magnetic layers of tunable strength (i.e., they reduce the coupling by increasing the thickness) and are compatible with media growth. Depending on the choice of material for CCL, and more particularly on the concentration of cobalt (Co) in the CCL, the CCL may have a thickness d3 of between about 0.2 to 1.5 nm. The CCL and the exchange bridge layer 350 together act to control the exchange interactions between adjacent RLs, and thus the value of d3 may be selected depending on the thickness of d1 so as to achieve the desired amount of exchange interaction.

The medium of FIG. 3 may be fabricated using well-known sputter deposition and lithographic processes. The SUL (or multiple films making up the SUL) may be sputter deposited on the substrate, which may be a hard disk. The materials of the EBL, CCL, RL and OC (any optional seed layers) are then sequentially deposited, typically by sputtering, to the desired thicknesses on the SUL. Then the structure is lithographically patterned and etched, such as by ion milling or reactive ion etching (RIE), down to the top of the exchange bridge base layer 351. This leaves the discrete magnetic islands 302, 304 on their underlying pedestals 312, 314 and nonmagnetic regions, like space 305, between the islands.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A patterned perpendicular magnetic recording medium comprising:
   a substrate;
   a soft underlayer (SUL) of soft magnetically permeable material on the substrate;
   a plurality of discrete islands comprising perpendicular magnetic recording material;
   an exchange bridge layer of soft magnetically permeable material between the SUL and the islands and connecting the islands with said soft magnetically permeable material, the exchange bridge layer being patterned into a plurality of discrete pedestals, each pedestal being located below an island, the exchange bridge material having a saturation magnetic flux density greater than the saturation magnetic flux density of the magnetic recording material;
   a coupling control layer (CCL) of nonmagnetic or weakly ferromagnetic material on each pedestal below its island for controlling ferromagnetic coupling between the perpendicular magnetic recording material in its island and the exchange bridge material; and
   a nonmagnetic exchange break layer (EBL) between the SUL and the exchange bridge layer for breaking magnetic exchange coupling between the exchange bridge layer and the SUL.

2. The medium of claim 1 wherein the thickness of the exchange bridge layer between the pedestals and the height of the pedestals control the amount of exchange coupling between the connected islands.

3. The medium of claim 1 wherein the thickness of the exchange bridge layer between the pedestals is between 0.5 and 3 nm.

4. The medium of claim 1 wherein the height of the pedestals is between 1 and 5 nm.

5. The medium of claim 1 wherein the exchange bridge layer is formed of a material selected from the group consisting of alloys of CoFe, CoNiFe, NiFe, FeCoB, CoCuFe, FeAlSi, FeTaN, FeN, FeTaC, CoTaZr and CoZrNb.

6. The medium of claim 1 wherein the exchange bridge layer comprises a multilayer selected from the group consisting of Co/Pt, Co/Pd and Co/Ni multilayers.

7. The medium of claim 1 wherein the CCL is formed of a material selected from the group consisting of (a) Pd, Pt, Ru, Rh, Ir and Cu, (b) a RuCo alloy with Co less than about 65 atomic percent, (c) a RuCoCr alloy with Co less than about 65 atomic percent, and (d) an alloy of Co and one or more of Cr and B with the combined content of Cr and B greater than about 30 atomic percent.

8. The medium of claim 1 wherein the SUL is formed of a material selected from the group consisting of alloys of CoFe, CoNiFe, NiFe, FeCoB, CoCuFe, FeAlSi, FeTaN, FeN, FeTaC, CoTaZr and CoZrNb.

9. The medium of claim 1 wherein the SUL is a lamination of multiple magnetically permeable films separated by nonmagnetic films.

10. The medium of claim 9 wherein the nonmagnetic films in the lamination provide antiferromagnetic coupling of the magnetically permeable films in the lamination.

11. The medium of claim 1 wherein the perpendicular magnetic recording material is selected from a chemically-ordered alloy selected from alloys of FePt, CoPt, FePd, CoPd, CoPt$_3$ and CoPd$_3$; a chemically-ordered L1$_0$ or L1$_1$ phase alloy selected from FePt—X and CoPt—X, where the element X is selected from the group consisting of Ni, Au, Cu, Pd and Ag; and a multilayer selected from the group consisting of Co/Pt, Co/Pd, Co/Ni, Fe/Pt and Fe/Pd multilayers.

12. The medium of claim 1 wherein the perpendicular magnetic recording material is a multilayer selected from the group consisting of Co/Pt, Co/Pd, Co/Ni, Fe/Pt and Fe/Pd multilayers.

13. The medium of claim 1 wherein the perpendicular magnetic recording material comprises a polycrystalline alloy comprising Co and Pt.

14. A patterned perpendicular magnetic recording disk comprising:
 a substrate;
 a soft underlayer (SUL) of soft magnetically permeable material on the substrate;
 a nonmagnetic exchange break layer (EBL) on the SUL;
 an exchange bridge layer of soft magnetically permeable material on the EBL, the exchange bridge layer comprising a base layer and a plurality of pedestals extending from the base layer and arranged in a pattern of generally concentric data tracks;
 a coupling control layer (CCL) on each pedestal and selected from a nonmagnetic material and a weakly ferromagnetic material; and
 a magnetic data island comprising perpendicular magnetic recording material on the CCL of each pedestal, the perpendicular magnetic recording material having a saturation magnetic flux density less than the saturation magnetic flux density of the exchange bridge material, wherein adjacent data islands and their underlying CCLs are connected by the exchange bridge layer, the CCL on each pedestal providing ferromagnetic exchange coupling between the perpendicular magnetic recording material above it and the exchange bridge material below it, and the exchange bridge layer and CCLs controlling exchange interaction between adjacent data islands to compensate for dipolar fields between adjacent islands.

15. The disk of claim 14 wherein thickness of the exchange bridge layer between the pedestals is between 0.5 and 3 nm and the height of the pedestals is between 1 and 5 nm.

16. The disk of claim 14 wherein the exchange bridge layer is formed of a material selected from the group consisting of alloys of CoFe, CoNiFe, NiFe, FeCoB, CoCuFe, FeAlSi, FeTaN, FeN, FeTaC, CoTaZr and CoZrNb.

17. The disk of claim 14 wherein the exchange bridge layer comprises a multilayer selected from the group consisting of Co/Pt, Co/Pd and Co/Ni multilayers.

18. The disk of claim 14 wherein the CCL is formed of a material selected from the group consisting of (a) Pd, Pt, Ru, Rh, Ir and Cu, (b) a RuCo alloy with Co less than about 65 atomic percent, (c) a RuCoCr alloy with Co less than about 65 atomic percent, and (d) an alloy of Co and one or more of Cr and B with the combined content of Cr and B greater than about 30 atomic percent.

19. The disk of claim 14 further comprising a heat sink layer between the substrate and the exchange bridge layer.

20. A magnetic recording disk drive comprising:
 the disk of claim 14;
 a write head for magnetizing the magnetic recording material in the data islands; and
 a read head for reading the magnetized data islands.

21. A thermal assisted recording (TAR) magnetic recording disk drive comprising:
 the disk of claim 14 further comprising a heat sink layer between the substrate and the exchange bridge layer;
 a write head for applying a magnetic field to the data islands;
 an optical data channel and near-field transducer for directing radiation to the data islands to heat the islands in the presence of the magnetic field from the write head to enable the magnetic recording material in the data islands to be magnetized, wherein the pedestals focus the radiation to the islands; and
 a read head for reading the magnetized data islands.

* * * * *